United States Patent [19] — Iida

[11] Patent Number: 5,051,884
[45] Date of Patent: Sep. 24, 1991

[54] CONTROL APPARATUS FOR AUTOMOBILE AIR-CONDITIONERS

[75] Inventor: Katsumi Iida, Konan, Japan

[73] Assignee: Diesel Kiki Co., Ltd., Tokyo, Japan

[21] Appl. No.: 344,394

[22] Filed: Apr. 28, 1989

[30] Foreign Application Priority Data

May 16, 1988 [JP] Japan ................................ 63-118883

[51] Int. Cl.$^5$ .............................................. B60H 1/00
[52] U.S. Cl. ..................................... 364/148; 98/201;
98/209; 165/16; 165/17; 236/13; 364/140
[58] Field of Search ................. 98/2.01, 2.09; 165/16,
165/17; 236/13; 364/140, 148

[56] References Cited

U.S. PATENT DOCUMENTS

| | | | |
|---|---|---|---|
| 4,498,309 | 2/1985 | Kobayashi et al. | 236/49.3 X |
| 4,602,675 | 7/1986 | Kobayashi | 236/49.3 X |
| 4,685,508 | 8/1987 | Iida | 165/28 X |
| 4,697,734 | 10/1987 | Ueda | 165/16 X |
| 4,858,677 | 8/1989 | Doi et al. | 165/16 X |
| 4,901,788 | 2/1990 | Doi | 98/2.01 X |
| 4,928,499 | 5/1990 | Kiminami et al. | 98/2.01 X |

FOREIGN PATENT DOCUMENTS 59-19849 5/1984 Japan .

Primary Examiner—Parshotam S. Lall
Assistant Examiner—Edward R. Cosimano
Attorney, Agent, or Firm—Wenderoth, Lind & Ponack

[57] ABSTRACT

In a control apparatus for automobile air-conditioner of the type wherein the air blow-off mode is determined based on the opening of an air-mix door and the substantial temperature of an evaporator for actuating a mode door, the improvement which includes a judgment circuit for making a determination as to whether or not the outside air temperature is lower than a predetermined value in a heat mode operation and whether or not a defrosting operation is needed, and a bleed determination circuit for determining the amount of air bleed needed to be provided to a defrost outlet based on the result of the determination of the judgment circuit and the temperature of an upper part of the vehicle compartment. With this arrangement, the amount of air bleed provided to the defrost outlet can be varied continuously in accordance with the upper-part temperature in a range of between the heat mode and a defrost-/heat mode.

3 Claims, 4 Drawing Sheets

FIG. I

CONTROL APPARATUS FOR AUTOMOBILE AIR-CONDITIONERS

BACKGROUND OF THE INVENTION

1. Field of the Invention

The present invention relates to a control apparatus for use in an automobile air-conditioner for controlling the supply mode of air to be blown into a vehicle compartment.

2. Description of the Prior Art

Japanese Patent Publication No. 59-19849, for example, discloses a conventional control apparatus for automobile air-conditioners. In the known control apparatus, a total signal which corresponds to a thermal load is calculated based on the temperature in the vehicle compartment, a setting temperature, etc. The thus calculated total signal is used to determine a prescribed mode pattern according to which the air blow-off mode is automatically changed to shift between a vent (VENT) mode, a bi-level (B/L) mode and a heat (HEAT) mode. Such automatic control however does not apply to the defrosting operation of the air-conditioner.

This is because when the windshield becomes frosted, the driver is able to initiate a defrosting operation at his own discretion, in preference to any other operations, thereby clearing up the windshield immediately.

This manual defrosting operation is in fact advantageous in case of emergency. However, if a defrost-/heat(DEF/HEAT) mode for keeping the driver's feet warm and also for keeping the windshield free of frost is controlled manually, a problem would arise in that the windshield still become frosted even when the air-conditioner is set to operate at the HEAT mode during the winter season or when the outside air temperature is low. In this instance, it is necessary for the driver to change the mode of operation of the air-conditioner from the HEAT mode to the DEF/HEAT mode to thereby prevent the windshield from frosting over. Conversely, if the DEF/HEAT mode continues for a long period of time, the driver's head is heated gradually and hence the driver is forced to change the mode of operation of the air-conditioner. With this frequent mode change, an automated operation of the air-conditioner in all seasons is difficult to achieve.

SUMMARY OF THE INVENTION

It is accordingly an object of the present invention to provide a control apparatus for automobile air-conditioners which is capable of controlling the defrosting operation at low outside temperatures while keeping the head of the driver at a pleasant temperature.

Another object of the present invention is to provide a control apparatus for an automobile air-conditioner which is capable of expanding the range of automatic control of the of the air blow off mode of the air-conditioner.

According to the present invention, there is provided an apparatus for controlling the operation of an automobile air-conditioner, comprising: an opening calculation means for calculating a target opening of an air-mix door according to a thermal load in a vehicle compartment; a mode control signal calculation means for calculating a mode control signal based on said target opening and at least one of a temperature of an evaporator and a temperature of air passed through said evaporator, thereby determining relative quantities of air to be discharged from a vent outlet and air to be discharged from a heat outlet; a judgment means for making a determination as to whether or not said mode control signal corresponds to a signal for setting up a heat mode and whether or not the temperature outside a vehicle compartment is lower than a predetermined value and hence a defrosting is needed; bleed determination means for determining the amount of air to be bled to a defrost outlet according to the temperature of an upper part of the vehicle compartment if the determination by said judgment means indicates that defrosting is necessary; and a drive control means for controlling at least one mode door based on a result of a calculation by said mode control signal calculation means and a result of a determination by said bleed determination means.

With this construction, when the outside air temperature is lower than the predetermined value, the amount of air bled to the defrost outlet is varied with the upper-part temperature to continuously control the air blow-off mode in a range between the heat (HEAT) mode and the defrost/heat (DEF/HEAT) mode, notwithstanding the fact that the mode door is set at the HEAT mode position by a changeover or a switching signal. With this controlled bleed to the defrost outlet, the windshield of the vehicle is always kept free of frost without causing an undue increase in the temperature in the vicinity of the driver's head.

Many other advantages and features of the present invention will become manifest to those versed in the art upon making reference to the detailed description and the accompanying drawings in which a preferred structural embodiment incorporating the principles of the present invention is shown by way of illustrative example.

DETAILED DESCRIPTION

The present invention will be described herein below in greater detail with reference to an embodiment shown in the accompanying drawings.

Figure 1:
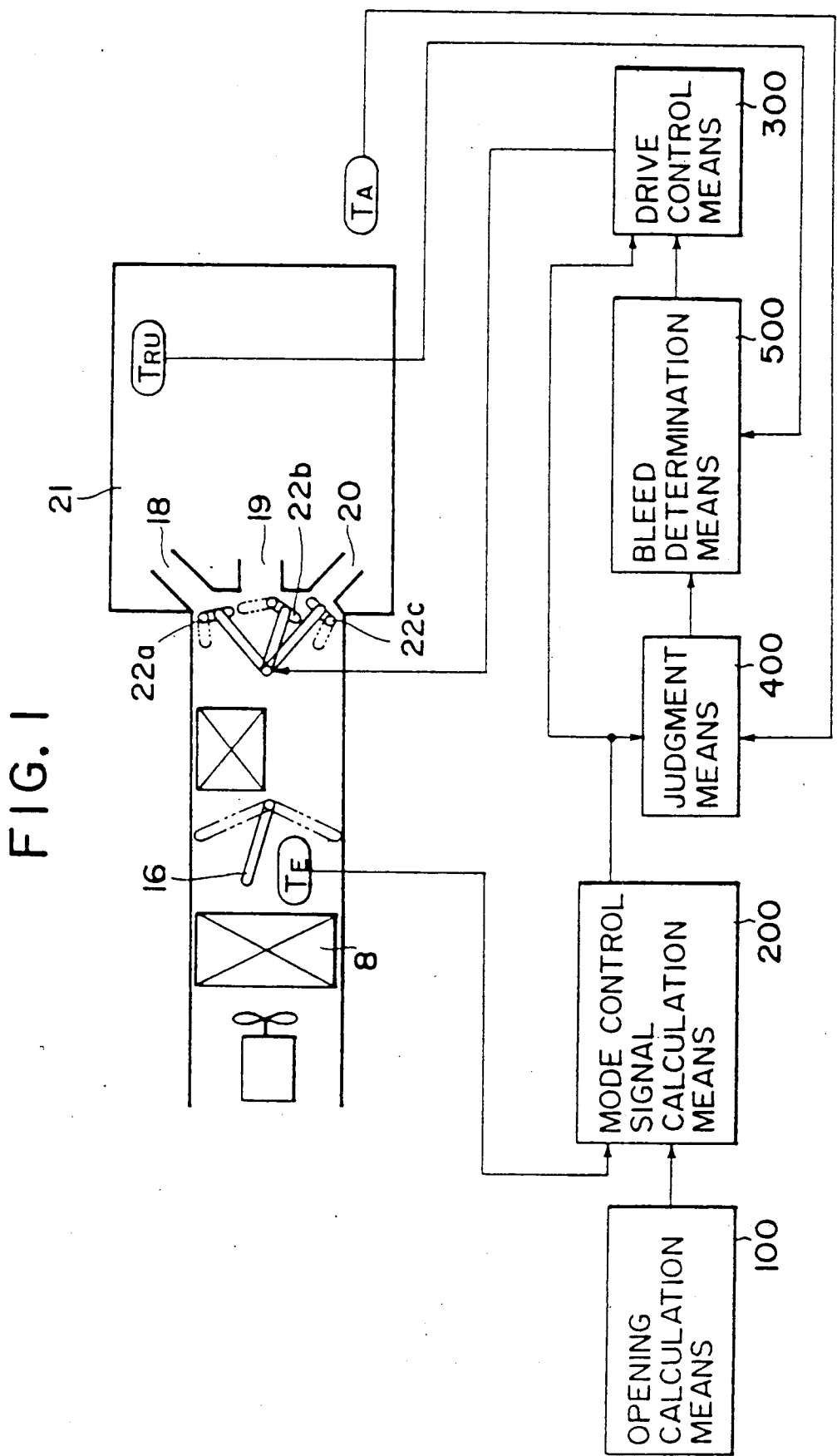
FIG. 1 is a block diagram showing the general construction of a control apparatus for an automobile air-conditioner according to the present invention.

FIG. 1 shows the general construction of an apparatus for controlling the operation of an automobile air-conditioner according to the present invention. The apparatus for controlling the operation of an automobile air-conditioner includes: an opening calculation means 100 for calculating a target opening of an air-mix door 16 according to a thermal load in a vehicle compartment; a mode control signal calculation means 200 for calculating a mode control signal based on said target opening and at least one of a temperature of an evaporator 8 and from a sensor TE, thereby determining relatively quantities of air to be discharged from a vent outlet 19 and air to be discharged from a heat outlet 20; a judgement means 400 for making a determination as to whether or not said mode control signal corresponds to a signal for setting up a heat mode and whether or not the temperature outside a vehicle compartment from a sensor TA is lower than a predetermined value and hence a defrosting is needed; a bleed determination means 500 for determining the amount of air to be bled to a defrost outlet 18 according to the temperature of an upper-part of the vehicle compartment from a sensor TRU if the determination by said judgment means 400 indicates that the defrosting is necessary; and a drive control means 300 for controlling at least one mode door based on a result of a calculation by said mode control signal calculation means 200 and a result of a determination by said bleed determination means 500.

Figure 2:
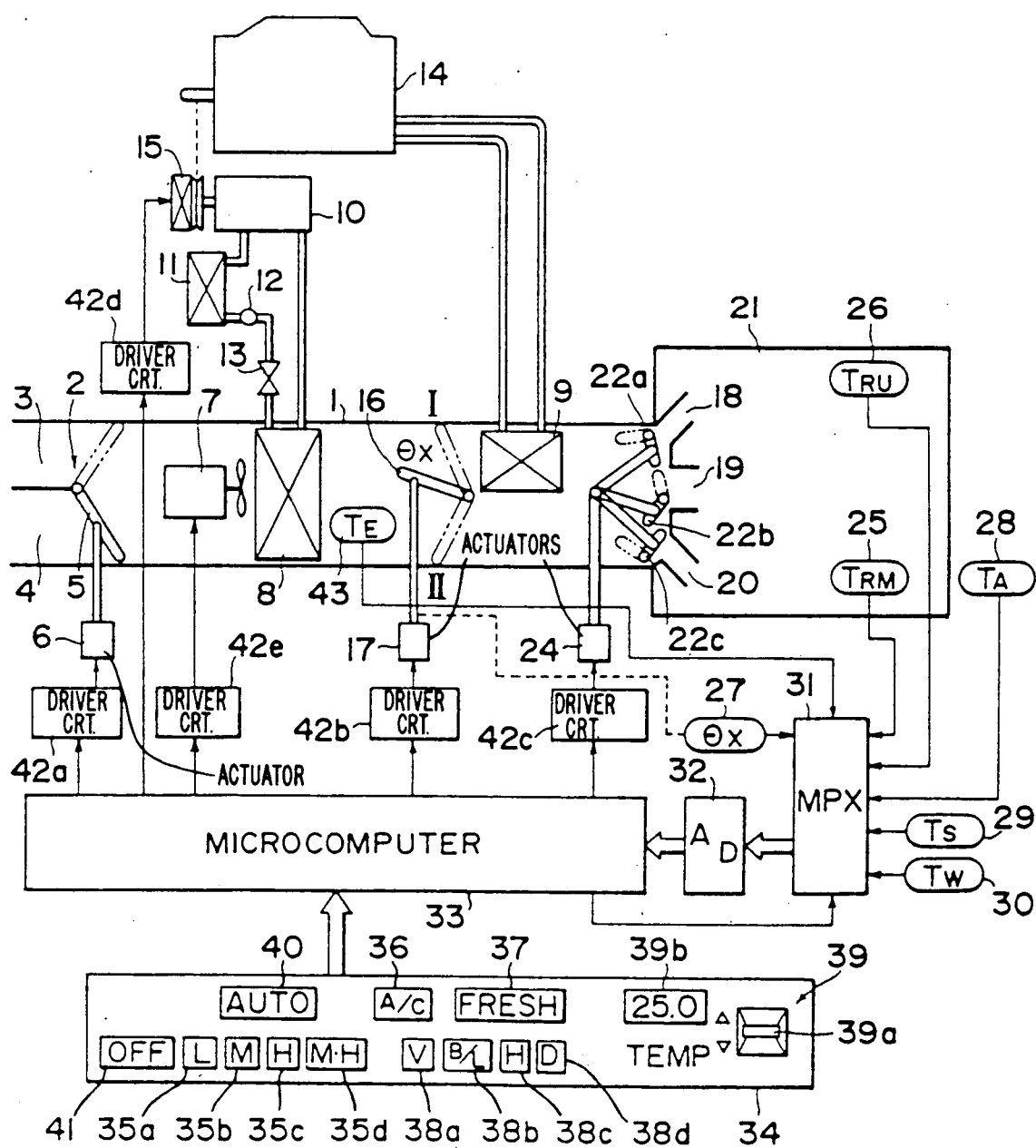
FIG. 2 is a diagrammatical view illustrative of the structural details of the automobile air conditioner control apparatus.

As shown in FIG. 2, an automobile air-conditioner includes an intake door changeover device 2 at the upstream end thereof. The intake door changeover device 2 includes a selecting door 5 disposed at the junction between a recirculated air inlet 3 and an outside air inlet 4 that are provided in bifurcated fashion. The selecting door 5 is operatively connected to an actuator 6 and driven by the latter to select one of the inlets 3 and 4 for allowing the recirculated air or the outside air to be drawn into the duct 1.

A blower 7 is disposed in the duct 1 immediately downstream of the changeover device to force the air to flow downstream through the duct 1. The duct 1 also includes an evaporator 8 and a heater core 9 disposed downstream of the blower 7 in the order named.

The evaporator 8 is connected in a fluid circuit with a compressor 10, a condenser 11, a receiver tank 12, and an expansion valve 13 so as to constitute jointly therewith a refrigeration system for performing a refrigeration cycle. The compressor 10 includes an electromagnetic clutch 15 for selectively connecting the compressor 10 to an engine 14 of a motor vehicle. The electromagnetic clutch 15 is engaged and disengaged to undertake an on-off control of the operation of the compressor 10. The heater core 9 serves to heat the air passing therethrough by the heat taken up from an engine cooling water which is recirculating through the heater core 9. An air-mix door 16 is disposed between the evaporator 8 and the heater core 9 and operatively connected to an actuator 17 to move between a full cool position indicated by the reference character I and a full hot position indicated by the reference character II. The opening $\theta x$ of the air-mix door 16 is regulated by the actuator 17 for adjustably changing the ratio of the amount of air flowing directly through the heater core 9 and the amount of air bypassing the heater core 9, so that the temperature of air to be discharged or blown-off from the duct 1 is controlled so as to be at a desired value.

The duct 1 has at its downstream end a defroster outlet 18, a vent outlet 19 and a heat outlet 20 that are provided in a branched fashion and all open to a vehicle compartment 21. Three mode doors 22a, 22b, 22c are disposed adjacent to the respective outlets 18–20 to open and close the outlets 18–20. The operation of the mode doors 22a–22c is controlled by an actuator 24 for selecting a desired mode of operation of the air-conditioner.

A vehicle compartment temperature sensor 25 is disposed on a floor, an instrument panel or the like part for detecting a representative temperature TRM in the vehicle compartment 21. An upper-part temperature sensor 26 is disposed on the inside surface of a roof panel, for example, for detecting the temperature TRU of an upper part of the vehicle compartment 21 in the vicinity of the head of an occupant of the motor vehicle. The opening $\theta x$ of the air-mix door 16 is detected by an opening sensor 27 which is composed, for example, of a potentiometer. Element 28 is an outside air temperature sensor for detecting the temperature TA outside the vehicle compartment 21. Reference character 29 denotes a sunlit portion temperature sensor for detecting the temperature Ts of a vehicle compartment portion which is exposed to the incident light of the sun (the radiant heat of the sun). A cooling water temperature sensor 30 is disposed on a heating medium supply pipe connected to the heater core 9 or a fin on the heater core 9 for detecting the temperature TW of the engine cooling water. Likewise, a mode sensor 43 is disposed either on the evaporator 8 for detecting the temperature of the evaporator 8, or downstream of the evaporator 8 for detecting the temperature (TE) of air passing through the evaporator 8. Output signals from the respective sensor 25 through 30 and 43 are inputted through a multiplexer (MPX) 31 to an A/D converter 32 in the order selected by the multiplexer 31. After having been digitized by the A/D converter 32, the digital output signals are delivered to a microcomputer 33.

The microcomputer 33 is also supplied with output signals from an instrument panel 34. The instrument panel 34 is provided with: a series of manual switches 35a–35d for selectively changing the rotational speed of the blower 7 between a level (L) by switch 35a, a medium level (M) by switch 35b, a high level (H) by switch 35c and a maximum high level (M·H) by switch 35d; a start switch (A/C) 36 for starting the compressor 10; a changeover switch (FRESH) 37 for selecting the recirculated air or the outside air to be introduced into the duct 1; four mode switches 38a–38d for selecting a discharge mode of the blow-off air, which includes a vent mode (V) activated by the manual switch 38a, a bi-level mode (B/L) activated by switch 38b, a heat mode (H) activated by switch 38c, and a defrost mode (D) activated by switch 38d; a temperature setter 39 for setting the temperature in the vehicle compartment 21 at a desired value; an automatic switch (AUTO) 40 for automatically controlling the rotational speed of the blower 7 and the air intake and discharge modes, and an off switch (OFF) 41 for forcibly placing all the switches stated above in their off state.

The temperature setter 39 is composed of an up-down switch 39a and a display unit 39b associated therewith. The up-down switch 39a is actuated to vary the setting temperature (Tset) within a predetermined range, the setting temperature (Tset) being indicated on the display unit 39b.

The temperature setter 39 may be of the type having a slidable temperature setting lever adapted to be manually actuated for adjustably setting the desired or target temperature.

The microcomputer 33 is of the conventional type known per se and comprises a central processing unit (CPU), read only memory (ROM), a random access memory (RAM) and an input/output port (I/O), none of which is shown. The microcomputer 33 operates to calculate control signals based on the various input signals set forth above and to deliver them through respective driver circuits 42a-42e to the actuators 6, 17, and 24, the electromagnetic clutch 15 and a motor of the blower 7 for controlling the operation of the various doors 5, 16, and 22a-22c, the on-off operation of the compressor 10 and the rotation of the blower motor.

Figure 3:
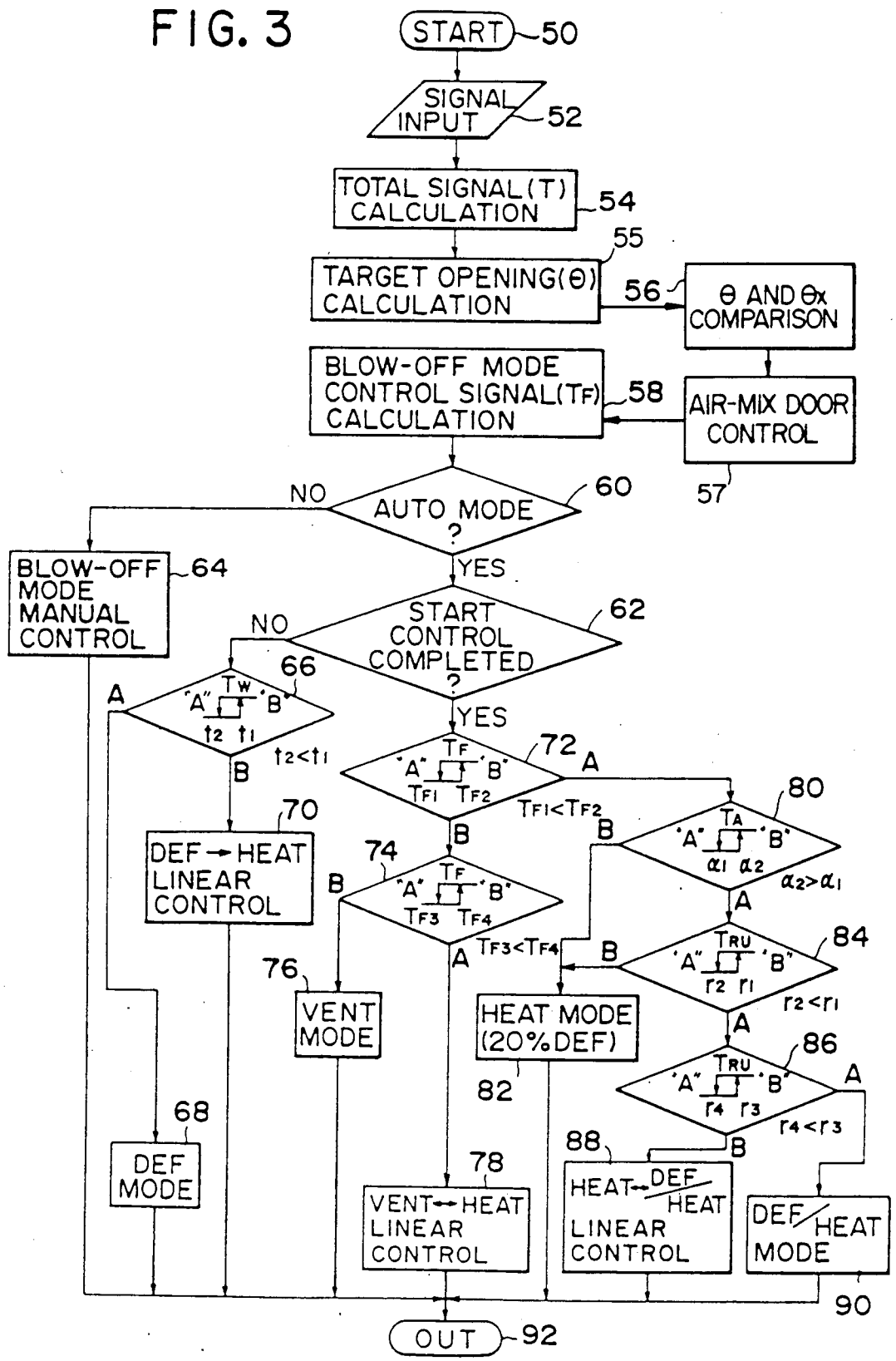
FIG. 3 is a flowchart showing a control routine achieved in a microcomputer incorporated in the control apparatus for controlling the air blow-off mode of the automobile air-conditioner.

The operation of the microcomputer 33 will be described below with reference to a flowchart shown in FIG. 3 in which a control routine for the control of the air blow-off mode of the air-conditioner.

The control routine of the microcomputer 33 starts in a step 50 in accordance with a program stored in the microcomputer 33. In the next step 52, various signals including an upper-part temperature (TRU) are inputted from the corresponding sensors 25-30 and 43 through the multiplexer 31 and the A/D converter 32 into the microcomputer 33 and they are then respectively stored in prescribed areas of the RAM. Thereafter, based on the thus-inputted signals, a total signal T corresponding to thermal load in the vehicle compartment is calculated in a step 54 in accordance with the following equation.

$$T = K1 \, TRM + K2 \, TA + K3 \, Ts - K4 \, Tset + C \quad (1)$$

where K1, K2, K3, K4 and C are constants.

Each of the above noted constants (K1, K2, K3, K4) is an empirically determined gain constant used to adjust the value of the corresponding element (TRM, TA, Tset) in order to obtain the desired effect on the total signal T, and C is a constant used to adjust the level of the total signal T, these constants be adjusted so as to obtain a good feeling by the air-conditioner.

Then the control proceeds to a step 55 in which a target opening $\theta$ for the air-mix door 16 is calculated and to a step 56 in which the target opening $\theta$ for the air-mix door 16 is then compared with the actual opening $\theta$ of the air-mix door 16. Then, in step 57, based on the result of the comparison in step 56, the air-mix door 16 is driven to a position in which the door 16 assumes the target opening $\theta$.

Thereafter, a blow-off mode control signal TF is calculated in a step 58 based on the target opening $\theta$ and the temperature of the evaporator or the temperature TE of air passed through the evaporator 8. This calculation is made in accordance with the following equation.

$$TF = TE + K5\theta \quad (2)$$

where K5 is a constant.

The constant K5 is an empirically determined gain-constant used to convert the target opening $\theta$ in order to obtain the desired effect on the blow-off mode control signal TF.

The control proceeds to a step 60 in which a determination is made as to whether or not the air blow-off mode is set to be controlled automatically. If the determination indicates the automatic control mode, then the control proceeds to a step 62. If not, i.e. the determination indicates the manual blow-off control mode, then the control goes to a step 64 in which control signals are produced for driving the mode doors 22a-22c according to the respective positions of the mode switches 38a-38d. Thereafter, the control moves through a step 92 to another control routine for performing the control of air-conditioning conditions.

At the initial stage of operation of the engine, the engine cooling water is not heated sufficiently. Consequently, when the air-conditioner is started at this stage, cool air is blown off in the vicinity of the feet of the driver, thus injuring the driver's feeling. In order to obviate such unpleasant air blowing, a determination is made in a step 62 to determine as to whether or not the start control has been completed. This determination utilizes, as a reference, whether a predetermined period of time required for sufficiently heating the engine cooling water has elapsed.

With respect to A and B in the following steps 66, 72, 74, 80, 84 and 86, A is the down level where each element for the determination having a hysteresis goes down, and B is the up level where the element having a hysteresis goes up.

If the determination in the step 62 indicates an incomplete start control, then the control proceeds to a step 66 in which a determination is made as to whether or not the cooling water temperature TW has been elevated to predetermined temperatures t1 and t2. If the cooling water temperature TW is lower than the predetermined temperatures t1 and t2, then the air blow-off mode is fixed to the defrost mode in a step 68 to thereby block the blowing of air toward the feet of the driver. When the cooling water temperature TW exceeds the predetermined temperatures t1 and t2, the air blow-off mode is changed linearly from the defrost mode to the heat mode in a step 70 so that the amount of air to be supplied to the driver's feet increases with an increase in temperature of the engine cooling water. After the steps 68 and 70, the control returns from the step 92 to the start step 50.

Figure 5:
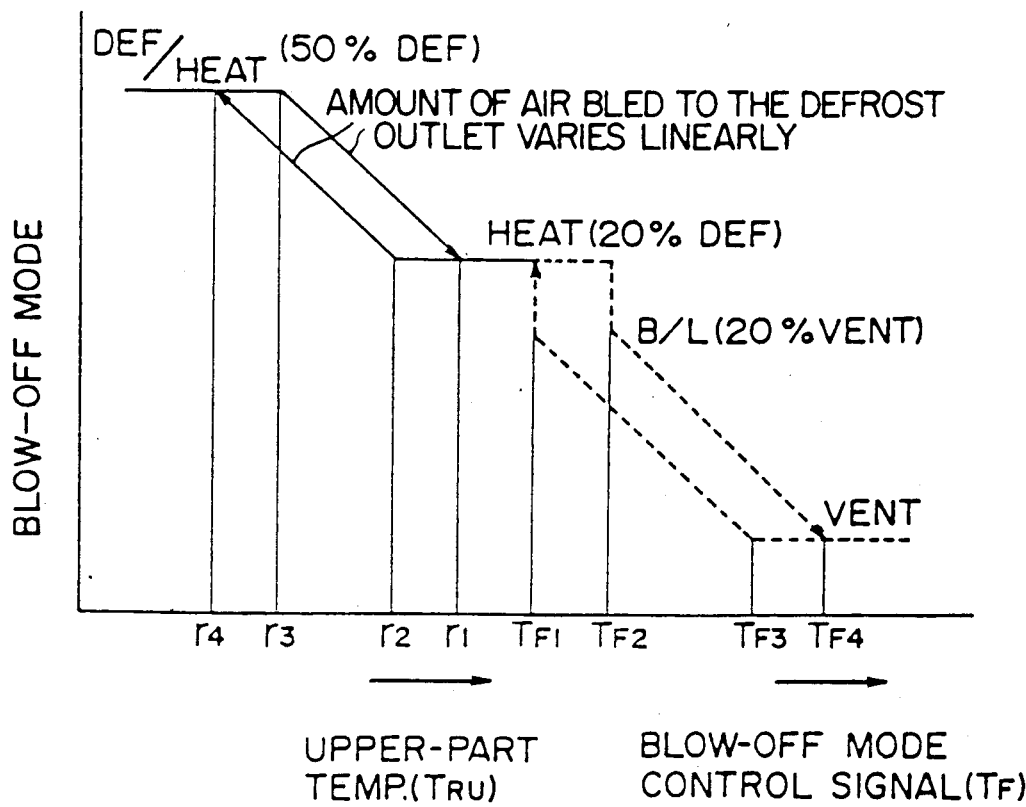
FIG. 5 is a graph illustrative of the air blow-off characteristics of the air-conditioner in various operation modes.

If the determination in the step 62 indicates a completed state of the start control, then the control goes to steps 72 through 78 for controlling the air blow-off mode between the vent mode and the heat mode according to the magnitude of the blow-off mode control signal TF, as indicated by the dashed lines shown in FIG. 5.

In the steps 72 and 74, the blow-off mode control signal TF is compared with first predetermined values TF1 and TF2 and also with second predetermined values TF3 and TF4, the first and second predetermined values TF1, TF2, TF3, and TF4 being stored in the ROM in the microcomputer 33. When TF is greater than the second predetermined values and TF4, then the air blow-off mode is fixed to the vent mode in the step 76. If TF is in a range between the first predetermined values and the second predetermined values, the opening of the mode door is changed to vary linearly with respect to the magnitude of TF in the step 78.

TF1 is smaller than TF2 and TF3 is smaller than TF4 in order to prevent the control system from becoming unstable due to hunting.

If TF is determined to be smaller than the first predetermined values in the step 72, the control goes to a step 80 without fixing the air blow-off mode to the heat mode as in the case of the conventional air-conditioner. In the step 80, a determination is made as to whether or not the outside air temperature TA is lower than predetermined temperatures a1 and a2 (a1 < a2). The predetermined temperatures a1 and a2 are used as reference temperatures at which the windshield tends to become frosted. If the outside air temperature is higher than the predetermined temperatures, this means that a positive defrosting operation is not necessary and hence the air blow-off mode is fixed to the heat mode in a step 82.

In general, the heat mode involves air being bled the defrost outlet 18 (hereinafter referred as "def-bleeding" for brevity) at about 20% by volume. If the determination in the step 80 indicates that the outside air TA is lower than the predetermined temperatures a1 and a2, this means that the windshield is likely to become frosted if the heat mode continues. The control therefore proceeds to 84 through 90 for controlling the air blow-off mode to vary between the heat mode and the defrost/heat mode as indicated by the solid lines shown in FIG. 5, in accordance with the upper-part temperature TRU in the vehicle compartment 21. An enhanced defrosting effect is obtained as the def-bleeding increases. However, if the defrost/heat mode involving 50% def-bleeding is selected when the upper-part temperature TRU is high, the driver will feel uncomfortable. To this end, the upper-part temperature TRU is compared with first predetermined temperatures r1 and r2 in the step 84 and also with second predetermined temperatures r3 and r4 in the step 86. The second predetermined temperatures r3, r4 are lower than the first predetermined temperatures r1, r2. If the upper-part temperature TRU is higher than the first predetermined temperatures r1 and r2, then the air blow-off mode is fixed to the heat mode in the step 82, thereby preventing an undue temperature rise in the vicinity of the driver's head. If the upper-part temperature is in a range between the first predetermined temperatures r1 and r2 and the second predetermined temperatures r3 and r4, then the air blow-off mode is set to vary between the heat mode and the defrost/heat mode in the step 88 in such a manner that the def-bleeding increases with a decrease in the upper-part temperature TRU. Thus, the defrosting operation is achieved efficiently without causing an unpleasant temperature rise in the vicinity of the driver's head. If the upper-part temperature TRU is lower than the second predetermined temperatures r3 and r4, the air blow off mode is fixed to the defrost/heat mode in the step 90.

The temperatures r1–r4 are experimentally determined by the effective temperature, for example, in order to realize a desire to keep the head cool and the feet warm and a desire to keep the windshield always free of frost. To prevent objectionable hunting of the control system, the first and second predetermined temperatures are selected such that $r2 < r1$ and $r4 < r3$.

After the steps 76, 78, 82, 88 and 90, the control returns from the step 92 to a main routine, not shown, and thereafter moves again to the start step 50.

Figure 4:
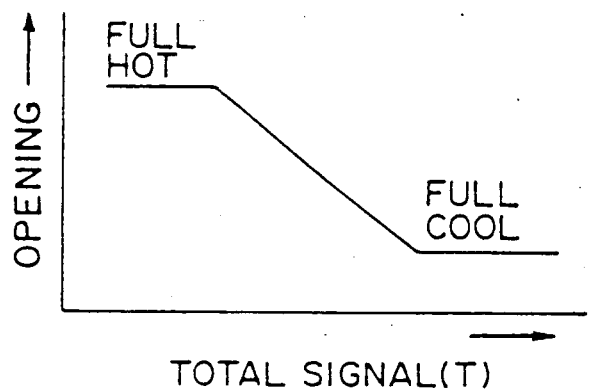
FIG. 4 is a graph showing a performance curve of an air-mix door representing the relationship between the opening of the air-mix door and the total signal.

FIG. 4 shows the relationship between the opening of the air-mix door and the total signal.

When the opening of the air-mixed door is completely opened in the position of "Full Hot", most of the cool air through the evaporator flows into the heater core for heating.

When the opening is completely shut (0%) in the position of "Full Cool", most of the cool air bypasses the heater core for air-conditioning.

Between the positions of "Full Hot" and "Full Cool", the opening of the air-mix door varies linearly according to the total signal T.

Thus, the air flowing through the heater core and bypassing the heater core divided by the air-mix door is mixed behind the heater core and becomes the blowing off air of the desired temperature according to the opening of the air-mix door.

FIG. 5 illustrates the air blow-off characteristics of the air-conditioner in various operating modes.

When the blow-off mode control signal $T_F$ increases from $T_{F1}$ to $T_{F2}$ and then is in the position of $T_{F2}$, the blow-off mode is changed from the heat mode to the bi-level (B/L) mode.

The heat mode at $T_{F2}$ has air bleeding to the heat outlet at 80% by volume and to the defrost outlet at 20% by volume.

The bi-level mode at $T_{F2}$ has air bleeding to the heat outlet at 80% by volume and to the vent outlet at 20% by volume.

Thus, the defrost outlet is closed and the vent outlet is opened at 20%.

When $T_F$ increases from $T_{F2}$ to $T_{F4}$, the air bleeding to the heat outlet varies linearly from 80% to 0% by volume and the air bleeding to the vent outlet varies linearly from 20% to 100%.

When $T_F$ decreases from $T_{F3}$ to $T_{F1}$, the air bleeding to the heat outlet varies linearly from 0% to 80%, and the air bleeding to the vent outlet varies linearly from 100% to 20%.

When $T_F$ is at $T_{F1}$, the blow-off mode is changed from the bi-level mode to the heat mode.

When the blow-off mode is the heat mode, the air bleeding to the defrost outlet and the heat outlet is varied in accordance with the upper-part temperature $T_{RU}$.

When $T_{RU}$ increases from $r_3$ to $r_1$, the air bleeding to the defrost outlet decreases linearly from 50% to 20% by volume and the air bleeding to the heat outlet increases from 50% to 80% by volume.

When $T_{RU}$ decreases from $r_2$ to $r_4$, the air bleeding to the defrost increases linearly from 20% to 50% by volume and the air bleeding to the heat outlet decreases linearly from 80% to 50% by volume.

Obviously, various modifications and variations of the present invention are possible in the light of the above teaching. It is therefore to be understood that within the scope of the appended claims the present invention may be practiced otherwise than as specifically described.

What is claimed is:

1. An apparatus for controlling the operation of an automobile air-conditioner, comprising:
   (a) an opening calculation means for calculating a target opening of an air-mix door according to a thermal load in a vehicle compartment;
   (b) a mode control signal calculation means for calculating a mode control signal based on said target opening and at least one of a temperature of an evaporator and a temperature of air passing through said evaporator, thereby determining relative quantities of air to be discharged from a vent outlet and air to be discharged from a heat outlet;
   (c) a judgment means for making a determination as to whether said mode control signal corresponds to a signal for setting up a heat mode and whether the temperature outside a vehicle compartment is lower than a predetermined value and hence a defrosting is needed;
   (d) a bleed determination means for determining the amount of air to be bled to a defrost outlet according to the temperature of an upper part of the vehicle compartment if the determination by said judgment means indicates that defrosting is necessary; and
   (e) a drive control means for controlling at least one mode door based on a result of a calculation by said mode control signal calculation means and a result of the determination of said bleed determination means.

2. A control apparatus according to claim 1, wherein said drive control means is operative to actuate said mode door for controlling the air blow-off mode to vary from a heat mode to a vent mode as the magnitude of said mode control signal from said mode control signal from said mode control signal calculation means increases.

3. A control apparatus according to claim 1, wherein said drive control means is operative to actuate said mode door for controlling the air blow-off mode to vary from a heat mode to a defrost/heat mode in such a manner that the amount of air bled to said defrost outlet varies linearly with a reduction in the temperature of the upper part of the vehicle compartment according to the output of said bleed determination means.

* * * * *